UNITED STATES PATENT OFFICE.

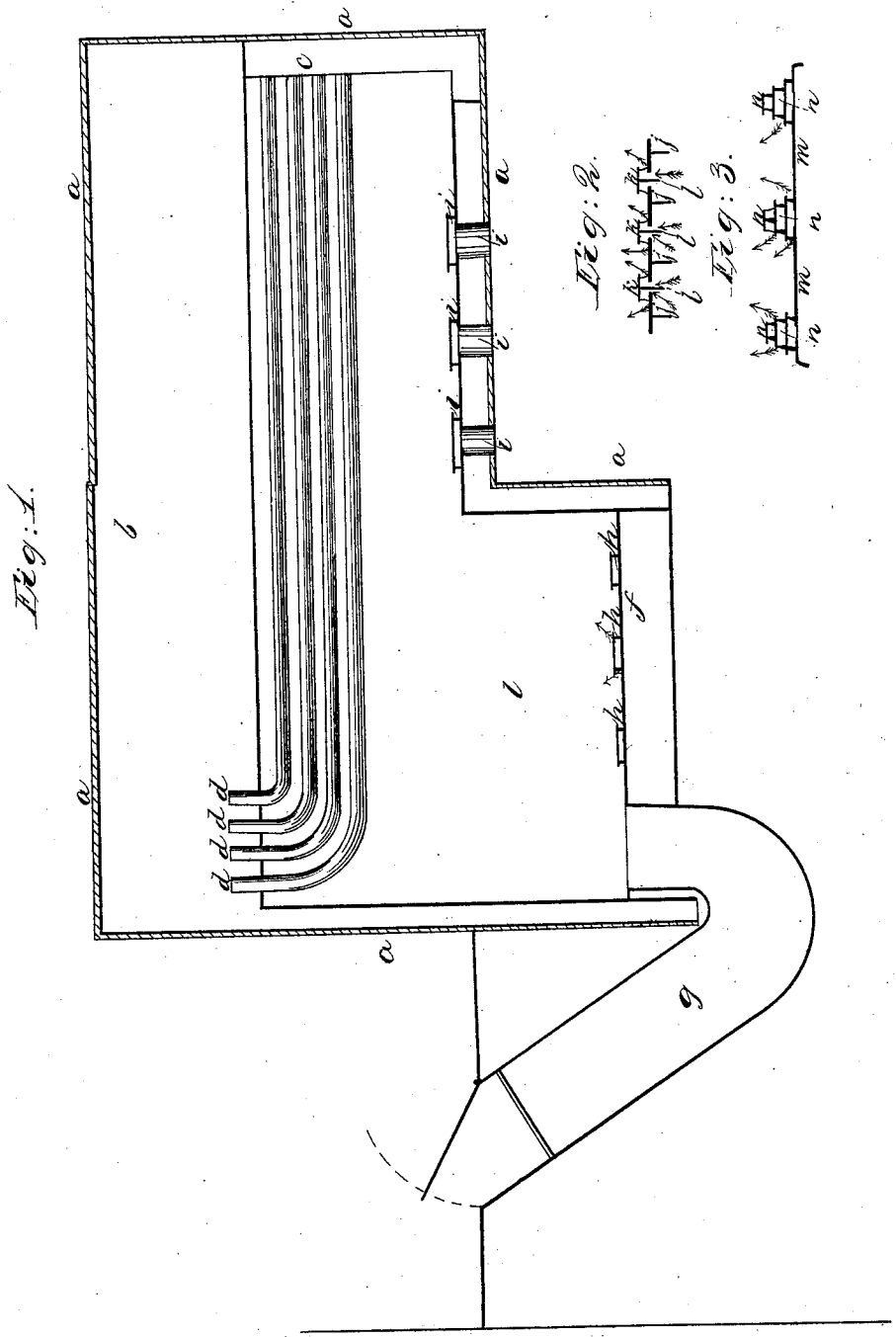
F. P. Dimpfel,
Steam-Boiler Furnace,
N°22,169.                Patented Nov. 30, 1858.

F. P. DIMPFEL, OF PHILADELPHIA, PENNSYLVANIA.

FURNACE OF STEAM-BOILERS.

Specification of Letters Patent No. 22,169, dated November 30, 1858.

*To all whom it may concern:*

Be it known that I, F. P. DIMPFEL, of the city of Philadelphia, in the State of Pennsylvania, have invented certain new and useful improvements in steam-boilers for burning the finer particles of coal and other fuels and consuming the products of combustion; and I do hereby declare that the following is a full and exact description thereof, reference being had to the accompanying drawings and to the letters and marks thereon.

My invention consists in passing in atmospheric air through openings through the water spaces, and in distributing the air through guarded openings, so that the streams of air may be deflected, heated and diffused over a larger surface of heated products of combustion, also that the passages for the air shall not be clogged.

To enable others skilled in the art to make and use my invention, I will describe its construction and operation.

By the drawings of this application my improvements are shown as applied to a tubular boiler, in which—

(*a*) indicates the shell of the boiler, (*b*) the steam-space, (*c*) front, rear, and bottom water-spaces, (*d*) water-tubes (*e*) furnace, (*f*) grate, (*g*) fuel feeder, (*h*) air passages to the bottom of the furnace and (*i*) like passages to the flue surface or chamber of combustion, which passages may be through the stays or otherwise; these references applying more particularly to Figure 1 of the drawings.

By Fig. 2 my invention is shown as applied to an ordinary grate surface; and by Fig. 3, a modification, designed either for the furnace-bottom, flue surface or combustion chamber.

In Fig. 2 (*j*) indicates the grate bar, (*k*) the guard plate or deflector over the air passage (*e*), the center part of the guard plate dividing the air passage into two as marked by the arrows. (*m*) indicates the flue surface plate in Fig. 3, (*n*) the guard plates, which are here shown as being made up of three plates, the upper one being the smallest and the bottom one the largest, the three together making a structure of three successive deflecting plates and spaces. These plates may be of any form desirable. The arrows in Fig. 3, indicate the track of atmospheric air, entering the opening in the flue or furnace-sheet and passing out between the disks or plates into the fuel or among the products of combustion.

My invention is of a great practical value in all kinds of furnaces, whether applied to the sides above the fuel or as shown by Fig. 1, and whether comminuted or other fuel be used, for whatever be the fuel there will always be considerable quantity of unconsumed matter passing into the flues and combustion chambers and which clogs up the flues and chambers or passes out unconsumed, or, as frequently is consumed where, as in the smoke-box of locomotive boilers, it is detrimental and injurious by burning out surfaces not in contact with water or fluids to be evaporated or heated.

The guard-plates or deflector of this invention will be kept in a heated condition by the current of burning products passing over them, and, hence, the atmospheric air in passing through the openings coming in contact with the heated guard-plates or deflector is heated and thus becomes more useful.

The practical difference between passing atmospheric air into the furnace and flues between and against the deflecting plates and passing it directly through apertures into the furnace is this, that a given quantity of air will be heated and diffused over a larger surface, consequently come in contact with a greater volume of products of combustion, or fine particles of coal, and, hence, produce more perfect ignition; while the guard-plates deflect the air among the products of combustion and combustible matter.

Having thus fully set out my invention, what I claim as new and desire to secure by Letters Patent is—

1. The passages through the water spaces entering the combustion chamber or extension of the furnace, as herein described.

2. I, also, claim the means, substantially as described, for providing for the perfect consumption of the finer particles of fuel and products of combustion, as herein set forth.

F. P. DIMPFEL.

Witnesses:
 THOMPSON BLACK,
 HUGH McAFEE.